United States Patent
Huh

(10) Patent No.: US 7,453,676 B2
(45) Date of Patent: Nov. 18, 2008

(54) RC-TRIGGERED ESD POWER CLAMP CIRCUIT AND METHOD FOR PROVIDING ESD PROTECTION

(76) Inventor: Yoon J. Huh, 1044 Bentoak La., San Jose, CA (US) 95129

(*) Notice: Subject to any disclaimer, the term of this patent is extended or adjusted under 35 U.S.C. 154(b) by 150 days.

(21) Appl. No.: 11/281,052

(22) Filed: Nov. 16, 2005

(65) Prior Publication Data

US 2007/0109697 A1 May 17, 2007

(51) Int. Cl.
*H02H 9/00* (2006.01)
(52) U.S. Cl. ......................................... 361/56
(58) Field of Classification Search ................... 361/56, 361/111, 54
See application file for complete search history.

(56) References Cited

U.S. PATENT DOCUMENTS

| | | | |
|---|---|---|---|
| 6,385,021 B1 * | 5/2002 | Takeda et al. | 361/56 |
| 6,724,603 B2 * | 4/2004 | Miller et al. | 361/111 |
| 6,912,109 B1 | 6/2005 | Ker et al. | |
| 6,920,026 B2 | 7/2005 | Chen et al. | |
| 2004/0136126 A1 * | 7/2004 | Smith | 361/56 |

\* cited by examiner

*Primary Examiner*—Michael J Sherry
*Assistant Examiner*—Lucy Thomas
(74) *Attorney, Agent, or Firm*—Thomas H. Ham; Wilson & Ham

(57) ABSTRACT

An RC-triggered electrostatic discharge (ESD) power clamp circuit and method for providing ESD protection uses a control circuit with a latch to selectively activate a clamping transistor to discharge ESD on a first voltage rail to a second voltage rail.

20 Claims, 3 Drawing Sheets

RC-TRIGGERED ESD POWER CLAMP CIRCUIT AND METHOD FOR PROVIDING ESD PROTECTION

BACKGROUND OF THE INVENTION

Electrostatic discharge (ESD) can damage devices fabricated on integrated circuit (IC) chips, causing performance degradation or failures. Consequently, one of many considerations for IC design is on-chip ESD protection. However, due to the ever-increasing requirements for higher speeds, smaller devices and product reliability, the significance of on-chip ESD protection has now become critical in IC design.

An on-chip ESD protection circuit of interest is an RC-triggered ESD power clamp circuit. A conventional RC-triggered power clamp circuit includes an N-channel metal oxide semiconductor (NMOS) clamping transistor, an inverter (or inverter chain) and an RC circuit. The NMOS clamping transistor is connected between a VDD rail and a VSS rail. The RC circuit is also connected between the VDD rail and the VSS rail. The RC circuit comprises a resistive element and a capacitor, which are connected in series between the VDD rail and the VSS rail. The resistive element can be an NMOS or P-channel metal oxide semiconductor (PMOS) transistor. The output of the inverter is connected to the gate of the NMOS clamping transistor and the input of the inverter is connected to the output of the RC circuit at a node between the resistive element and the capacitor.

The rise time of VDD during power-up under normal operation is in millisecond range. Since this rise time of VDD is longer than the RC delay of the RC delay circuit, the output of RC circuit is at the same potential as the VDD power rail, and thus, the NMOS clamping transistor is not turned on and remains in the off state. However, when a positive ESD, whose rise time is in sub-micro second range, appears on the VDD rail, the RC circuit and the inverter operate to turn on the NMOS clamping transistor to route the ESD to the VSS rail through the NMOS clamping transistor to prevent the ESD from reaching the downstream devices. After the ESD event, the NMOS clamping transistor is again turned off so that normal operations may continue.

A concern with the conventional RC-triggered power clamp circuit is that false triggering of the NMOS clamping transistor may occur during normal operations when either voltage overshoot occurs on the VDD rail or VDD power-up rise time is extremely fast ($\mu s$ range). Another concern with the conventional RC-triggered power clamp circuit is that the RC time constant is relatively short. Longer RC time constant is desired for such an ESD protection circuit since it provides more time to discharge ESD through the NMOS clamping transistor. Longer RC time constant can be achieved by increasing the capacitor size. However, such a large capacitor requires a significant amount of valuable chip real estate, which makes this RC triggered circuit based ESD solution impractical.

In view of these concerns, there is a need for an RC-triggered power clamp circuit and method for providing ESD protection with reduced false triggering and increased RC time constant.

SUMMARY OF THE INVENTION

An RC-triggered electrostatic discharge (ESD) power clamp circuit and method for providing ESD protection uses a control circuit to selectively activate a clamping transistor to discharge ESD on a first voltage rail to a second voltage rail. The control circuit includes enable and disable switches and a latch to selectively activate and deactivate the clamping transistor. The enable switch comprises a cascaded diode connected in series with a transistor, which ensures that the clamping transistor turns off even with very fast VDD power glitch or during VDD power-up with the rise time of up to 0.5 $\mu s$. The latch allows the clamping transistor to be driven without voltage loss caused by the cascaded diode. Therefore, the latch allows unambiguous signals to the clamping transistor for activation or deactivation. In addition, RC time constant can be increased by adjusting the ratio of devices in the latch circuit.

An ESD protection circuit in accordance with an embodiment of the invention comprises an RC circuit connected to a first voltage rail to produce an RC-based signal in response to an ESD on the first voltage rail, a clamping transistor connected between the first voltage rail and a second voltage rail, and a control circuit connected between the RC circuit and the clamping transistor. The control circuit includes a latch having first and second terminals. The first terminal of the latch is connected to the clamping transistor. The control circuit is configured to selectively connect one of the first and second terminals of the latch to the first voltage rail in response to the RC-based signal from the RC circuit to selectively activate the clamping transistor to discharge the ESD on the first voltage rail to the second voltage rail.

An ESD protection circuit in accordance with another embodiment of the invention comprises an RC delay unit and a number of clamping units. The RC delay unit is connected to a first voltage rail to produce an RC-based signal in response to an ESD on the first voltage rail. The RC delay unit includes an output to transmit the RC-based signal. Each of the clamping units is connected to the output of the RC delay unit to receive the RC-based signal. Each of the clamping units comprises a clamping transistor connected between the first voltage rail and a second voltage rail, and a control circuit connected to the clamping transistor. The control circuit includes a latch having first and second terminals. The first terminal of the latch is connected to the clamping transistor. The control circuit is configured to selectively connect one of the first and second terminals of the latch to the first voltage rail in response to the RC-based signal from the RC delay unit to selectively activate the clamping transistor to discharge the ESD on the first voltage rail to the second voltage rail.

A method for providing ESD protection in accordance with an embodiment of the invention comprises producing an RC-based signal in response to an ESD on a first voltage rail, connecting a control terminal of a clamping transistor to the first voltage rail through a first signal path using the RC-based signal such that the clamping transistor is activated to provide a conduction path from the first voltage rail to a second voltage rail through the clamping transistor, connecting a first terminal of a latch to the first voltage rail through a second signal path using the RC-based signal to produce a first signal at the first terminal of the latch, and producing a second signal at a second terminal of the latch connected to the first signal path and the control terminal of the clamping transistor in response to the first signal at the first terminal of the latch such that the clamping transistor is deactivated to disconnect the conduction path from the first voltage rail to the second voltage rail.

Other aspects and advantages of the present invention will become apparent from the following detailed description, taken in conjunction with the accompanying drawings, illustrated by way of example of the principles of the invention.

DETAILED DESCRIPTION

Figure 1:
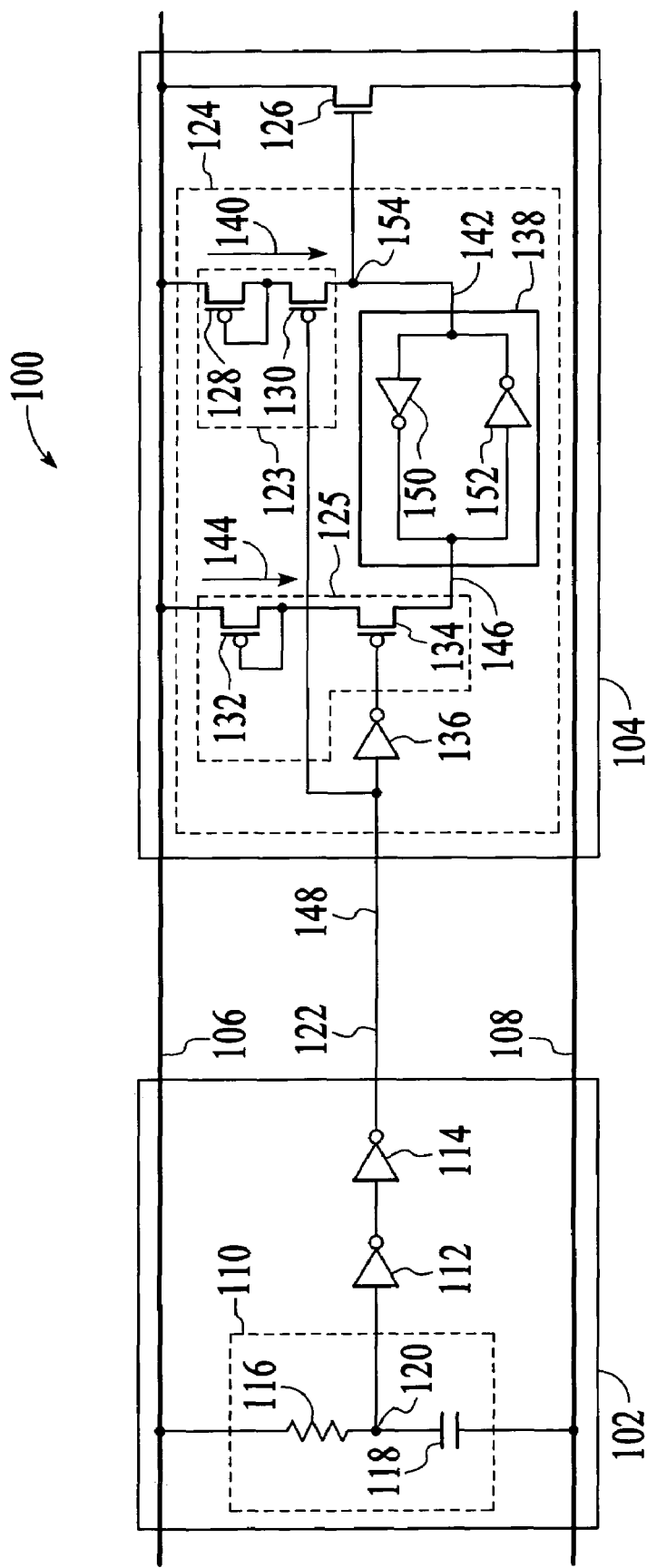
FIG. 1 is a diagram of an RC-triggered electrostatic discharge (ESD) power clamp circuit in accordance with an embodiment of the invention.

With reference to FIG. 1, an RC-triggered electrostatic discharge (ESD) power clamp circuit 100 in accordance with an embodiment of the invention is described. The RC-triggered ESD power clamp circuit 100 is an ESD protection circuit that can be incorporated into an integrated circuit (IC) chip to provide on-chip ESD protection for devices on the IC chip. The design of the RC-triggered ESD power clamp circuit 100 allows false triggering caused by non-ESD fluctuations to be prevented. In addition, the design of the RC-triggered ESD power clamp circuit 100 allows the RC time constant to be increased, which allows sufficient time for the circuit to discharge ESD.

As shown in FIG. 1, the RC-triggered ESD power clamp circuit 100 includes an RC delay unit 102 and a clamping unit 104. The RC delay unit 102 operates to produce an RC-based signal in response to a positive ESD on a high voltage rail 106, e.g., a VDD rail. The clamping unit 104 receives the RC-based signal from the RC delay unit 102 and establishes a conduction path from the high voltage rail 106 to a low voltage rail 108, e.g., a VSS rail, in response to the RC-based signal to route the ESD on the high voltage rail to the low voltage rail. In this fashion, the ESD is safely discharged to the low voltage rail 108 so that devices (not shown) connected to the high voltage rail 106 are protected from the ESD, which may cause structural damage to the devices.

The RC delay unit 102 comprises an RC circuit 110 and inverters 112 and 114. The RC circuit 102 includes a resistive element 116 and a capacitive element 118, which are connected in series between the VDD rail 106 and the VSS rail 108. In an implementation, the resistive element 116 may be one or more series transistors, such as N-channel metal oxide semiconductor (NMOS) transistors. The resistive element 116 is connected to the VDD rail 106, and the capacitive element 118 is connected to the VSS rail 108. The inverters 112 and 114 are connected in series from a node 120 between the resistive element 116 and the capacitive element 118 to an output 122 of the RC delay unit 102. Specifically, the inverter 112 is connected to the node 120, while the inverter 114 is connected to the output 122 of the RC delay unit 102.

The clamping unit 104 comprises a control circuit 124 and a clamping transistor 126. The control circuit 124 includes an enable switch 123, a disable switch 125, an inverter 136 and a latch 138. The enable switch 123 comprises P-channel metal oxide semiconductor (PMOS) transistors 128 and 130. The PMOS transistors 128 and 130 are connected in series on a signal path 140 connected between the VDD rail 106 and the latch 138. As described below, the PMOS transistor 130 operates as a switch to turn on the clamping transistor 126 when needed. The PMOS transistor 128 provides a cascaded PMOS diode in series with the PMOS transistor 130, which ensures that the clamping transistor 126 turns off even with very fast VDD power glitch or during VDD power-up with the rise time of up to 0.5 μs. The source of the PMOS transistor 128 is connected to the VDD rail 106, while the drain of the PMOS transistor 128 is connected to the source of the PMOS transistor 130. The control terminal or gate of the PMOS transistor 128 is connected to its drain. The drain of the PMOS transistor 130 is connected to a terminal 142 of the latch 138. Similarly, the disable switch 125 comprises PMOS transistors 132 and 134, which are connected in series on a signal path 144 connected between the VDD rail 106 and the latch 138. As described below, the PMOS transistor 134 operates as a switch to turn off the clamping transistor 126 when necessary. The source of the PMOS transistor 132 is connected to the VDD rail 106, while the drain of the PMOS transistor 132 is connected to the source of the PMOS transistor 134. The gate of the PMOS transistor 132 is connected to its drain. The drain of the PMOS transistor 134 is connected to a terminal 146 of the latch 138. The inverter 136 is connected between an input 148 of the clamping unit 104, which is connected to the output 132 of the RC delay unit 102, and the gate of the PMOS transistor 134 on the signal path 144. Thus, the input of the inverter 136 is connected to the output 122 of the RC delay unit 102 and the output of the inverter 136 is connected to the gate of the PMOS transistor 134. The input of the inverter 136 is also connected to the gate of the PMOS transistor 130 on the signal path 140. The latch 138 comprises two inverters 150 and 152, which are connected such that the output of one of the inverters is connected to the input of the other inverter. Thus, the input of the inverter 150 is connected to the output of the inverter 152, and the output of the inverter 150 is connected to the input of the inverter 152. The output of the inverter 150 and the input of the inverter 152 are connected to the terminal 146 of the latch 138, while the input of the inverter 150 and the output of the inverter 152 are connected to the other terminal 142 of the latch. Thus, when one of the terminals 142 and 146 of the latch 138 is "high" with respect to voltage, the other terminal of the latch will be "low" with respect to voltage. Similarly, when one of the terminals 142 and 146 of the latch 138 is "low", the other terminal of the latch will be "high". Consequently, opposite signals will appear at the terminals 142 and 146 of the latch 138. The latch 138 allows the clamping transistor 126 to be driven without voltage loss caused by the cascaded PMOS diode, i.e., the PMOS transistor 128. Therefore, the latch 138 allows unambiguous signals to be applied to the clamping transistor 126 for activation or deactivation.

The clamping transistor 126 is connected between the VDD rail 106 and the VSS rail 108. In this embodiment, the clamping transistor 126 is an NMOS transistor. However, in other embodiments, the clamping transistor 126 may be a PMOS transistor. The drain of the clamping transistor 126 is connected to the VDD rail 106, while the source of the clamping transistor is connected to the VSS rail 108. The gate of the clamping transistor 126 is connected to a node 154 on the signal path 140, which is located between the PMOS transistor 130 and the terminal 142 of the latch 138.

During normal operating conditions, the signal in the form of voltage at the node 120 of the RC delay unit 102 will be at VDD minus the voltage drop across the resistive element 116, which is nearly zero because the current going thru the resistive element is very small. This signal at the node 120 is equivalent to logic "high". Thus, the voltage at the output 122 of the RC delay unit 102 and at the gate of the PMOS transistor 130 will also be "high", which deactivates ("turns off") the PMOS transistor 130. However, due to the inverter 136, the voltage at the gate of the PMOS transistor 134 will be "low", which activates ("turns on") the PMOS transistor 134 and makes the voltage at the terminal 146 of the latch 138 "high". Due to the operation of the latch 138, the voltage at the other terminal 142 of the latch 138, and thus, at the gate of the NMOS clamping transistor 126, will be "low", which turns off the clamping transistor 126. Since the NMOS clamping transistor 126 is turned "off", the RC-triggered ESD power clamp circuit 100 is effectively deactivated.

When a positive ESD comes in on the VDD rail 106, the voltage on the VDD rail will rise almost immediately. However, the voltage at the node 120 will be "low" relative to the VDD rail 106 until the RC time, i.e., time equivalent to the RC time constant, lapses. Since the voltage at the node 120 is "low", the voltage at the output 122 of the RC delay unit 102 and at the gate of the PMOS transistor 130 will also be "low", turning on the PMOS transistor 130. Since the PMOS transistor 128 is also on, the voltage at the gate of the NMOS clamping transistor 126 will be "high" because the voltage on the VDD rail 106 will pass through the PMOS transistors 128 and 130. The "high" signal at the gate of the NMOS clamping transistor 126 turns on the NMOS clamping transistor, which provides a conduction path from the VDD rail 106 to the VSS rail 108 through the NMOS clamping transistor. The conduction path allows the ESD on the VDD rail 106 to be discharged to the VSS rail 108 through the NMOS clamping transistor 126.

After the lapse of the RC time, the voltage at the node 120 will be "high", which means that the voltage at the output 122 of the RC delay unit 102 and at the gate of the PMOS transistor 130 will also be "high", turning off the PMOS transistor 130. However, due to the inverter 136, the voltage at the gate of the PMOS transistor 134 will be "low", which turns on the PMOS transistor 134, pulling the voltage at the terminal 146 of the latch 138 "high". Due to the operation of the latch 138, the voltage at the other terminal 142 of the latch and at the gate of the NMOS clamping transistor 126 will be "low", turning off the NMOS clamping transistor.

Some of the advantages of the RC-triggered ESD power clamp circuit 100 over the prior art are now described. False triggering of the clamping transistor is a major drawback of conventional RC-triggered ESD power clamp circuits. The presence of the PMOS transistor 128 in the RC-triggered ESD power clamp circuit 100, which is connected to the PMOS transistor 130 that controls the activation of the NMOS clamping transistor 126, prevents false triggering of the clamping transistor. The voltage drop across the PMOS transistor 128 by a threshold and the tied gate and drain of the PMOS transistor 128 effectively prevents the NMOS clamping transistor 126 from being falsely turned on.

Another drawback of conventional RC-triggered ESD power clamp circuits is that they are sometimes difficult to turn off once triggered. The presence of the latch 138 connected to the gate of the NMOS clamping transistor 126 allows the RC-triggered ESD power clamp circuit 100 to quickly turn off the clamping transistor after ESD has been discharged to the VSS rail 108. In addition, the latch 138 along with the PMOS transistors 128 and 130 on the signal path 140 and the PMOS transistors 132 and 134 on the signal path 144 ensure that the voltage at the gate of the NMOS clamping transistor 126 will be either "high" or "low" without ambiguous state. Furthermore, the latch 138 allows the RC time constant of the RC-triggered ESD power clamp circuit 100 to be increased by adjusting the ratio of devices in the latch, such as the ratio of PMOS and NMOS devices in the latch.

In the embodiment illustrated in FIG. 1, the RC-triggered ESD power clamp circuit 100 includes a single RC delay unit and a single clamping unit, which operate together to provide ESD protection. However, in other embodiments, the RC-triggered ESD power clamp circuit in accordance with the invention may include multiple clamping units that operate with a single RC delay unit. That is, an RC delay unit is shared among a number of clamping units. Such an RC-triggered ESD power clamp circuit is illustrated in FIG. 2.

Figure 2:
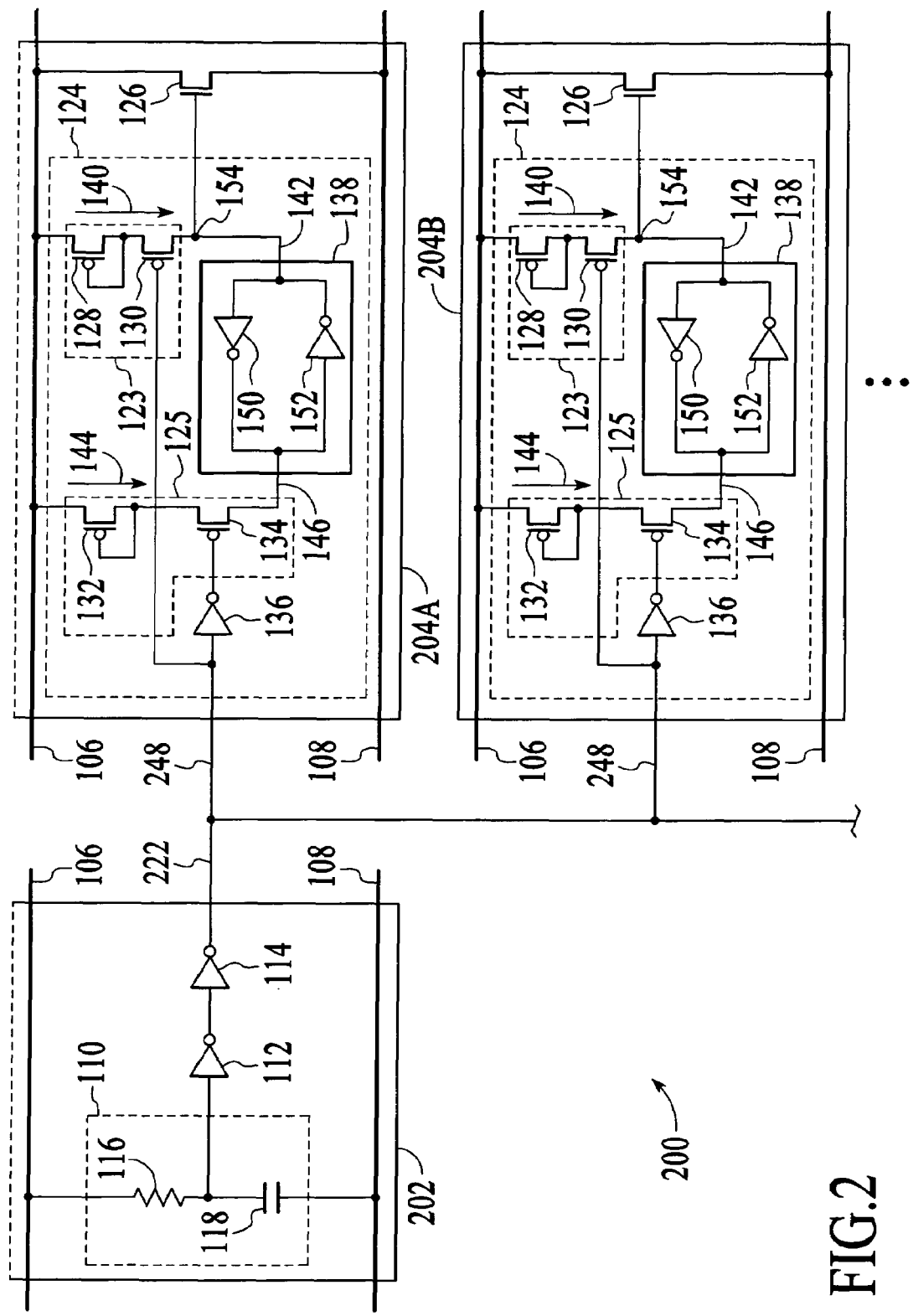
FIG. 2 is a diagram of an RC-triggered ESD power clamp circuit in accordance with another embodiment of the invention.

In FIG. 2, an RC-triggered ESD power clamp circuit 200 in accordance with another embodiment of the invention is shown. The same reference numbers used in FIG. 1 are used in FIG. 2 to identify similar elements. The RC-triggered ESD power clamp circuit 100 includes an RC delay unit 202 and multiple clamping units 204A, 204B . . . The RC delay unit 202 of the RC-triggered ESD power clamp circuit 200 is structurally similar to the RC delay unit 102 of the RC-triggered ESD power clamp circuit 100 and operates in the same manner as the RC delay unit 102. Each of the clamping units 204A, 204B . . . of the RC-triggered ESD power clamp circuit 200 is also structurally similar to the clamping unit 104 of the RC-triggered ESD power clamp circuit 100 and operates in the same manner as the clamping unit 104. In this embodiment, the output 222 of the RC delay unit 202 is connected to the input 248 of each of the clamping units 204A, 204B . . . . Thus, an RC-based signal from the RC delay unit 202 is used by all the clamping units 204A, 204B . . . to selectively activate and deactivate the respective NMOS clamping transistors 126. Because of the designated enable switch 123 in each of the clamping units 204A, 204B . . . , RC time delay caused by connections between the RC delay unit 202 and the clamping units 204A, 204B . . . delivering the output of RC delay unit to the clamping units doesn't prevent uniform turn-on of the distributed NMOS clamping transistor 126 in each clamping unit.

The clamping units 204A, 204B . . . can be strategically placed in different locations on an IC chip to provide ESD protection to vulnerable areas. Since each of the clamping units 204A, 204B . . . does not need a separate RC delay unit, the RC-triggered ESD power clamp circuit 200 requires less real estate on an IC chip than conventional RC-triggered ESD power clamp circuits to provide equivalent ESD protection. This shared RC delay unit design is an efficient use of real estate on an IC chip, which results in a significant layout area reduction. The RC-triggered ESD power clamp circuit 200 with only one RC delay unit 202 may be used for a typical IC chip. However, for large IC chips, the RC-triggered ESD power clamp circuit 200 may be modified to include multiple RC delay units to support a larger number of clamping units.

Figure 3:
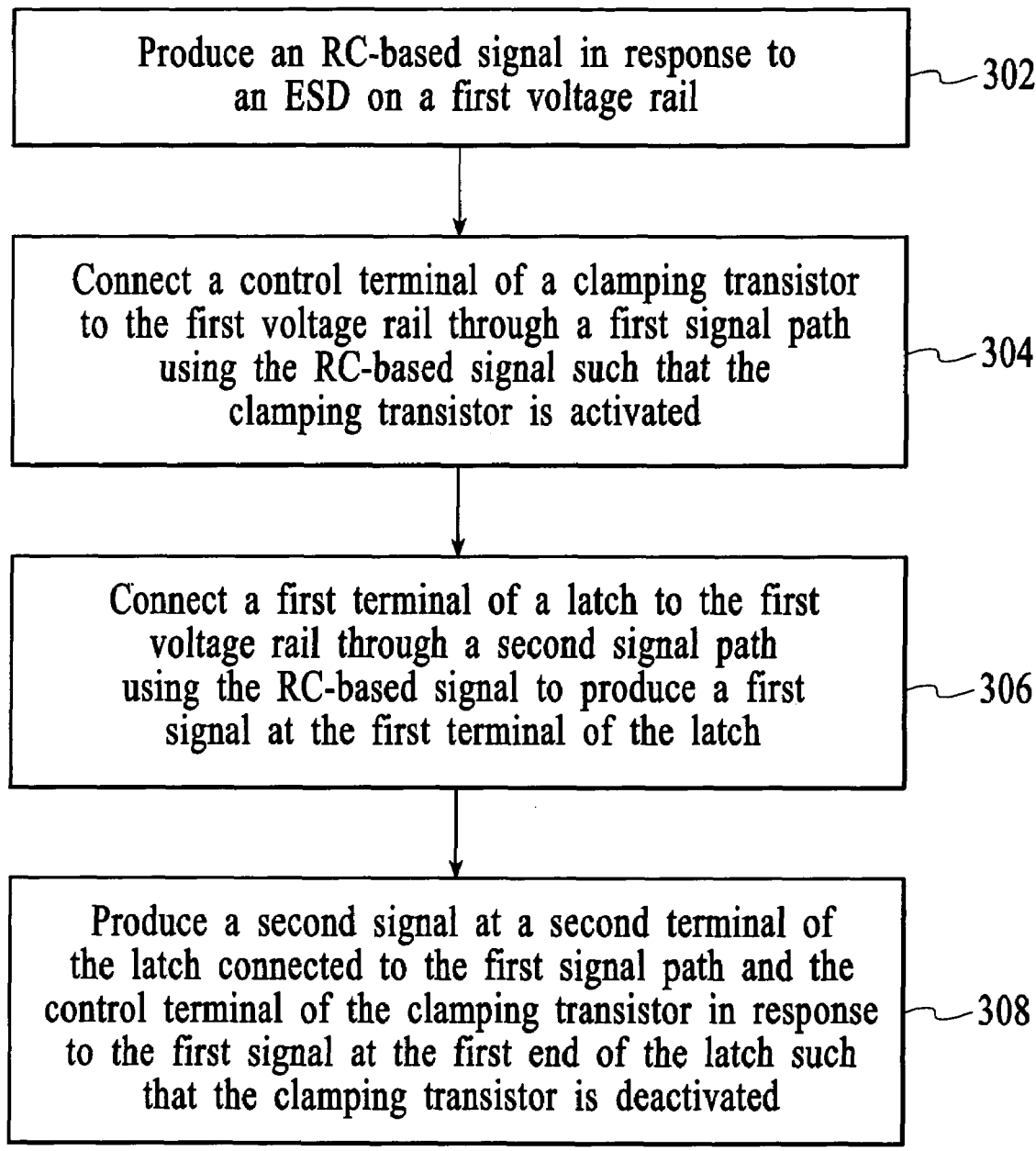
FIG. 3 is a flow diagram of a method for providing ESD protection in accordance with an embodiment of the invention.

A method for providing ESD protection in accordance with an embodiment of the invention is described with reference to a flow diagram of FIG. 3. At block 302, an RC-based signal is produced in response to an ESD on a first voltage rail, e.g., the VDD rail. Next, at block 304, a control terminal of a clamping transistor is connected to the first voltage rail through a first signal path using the RC-based signal such that the clamping transistor is activated. The activation of the clamping transistor provides a conduction path from the first voltage rail to a second voltage rail, e.g., the VSS rail, through the clamping transistor to discharge the ESD to the second voltage rail. Next, at block 306, a first terminal of a latch is connected to the first voltage rail through a second signal path using the RC-based signal to produce a first signal at the first terminal of the latch. Next, at block 308, a second signal is produced at a second terminal of the latch connected to the first signal path and the control terminal of the clamping transistor in response to the first signal at the first terminal of the latch such that the clamping transistor is deactivated. The deactivation of the clamping transistor disconnects the conduction path from the first voltage rail to the second voltage.

Although specific embodiments of the invention have been described and illustrated, the invention is not to be limited to the specific forms or arrangements of parts so described and illustrated. As an example, the RC-triggered ESD power clamp circuits 100 and 200 in accordance with the invention may use other types of transistors rather than the PMOS and NMOS transistors, such as Bipolar transistors or high electron mobility transistors (HEMTs). The scope of the invention is to be defined by the claims appended hereto and their equivalents.

What is claimed is:

1. An electrostatic discharge protection circuit comprising:
an RC circuit connected to a first voltage rail to produce an RC-based signal in response to an electrostatic discharge on said first voltage rail;
a clamping transistor connected between said first voltage rail and a second voltage rail; and
a control circuit connected between said RC circuit and said clamping transistor, said control circuit including an enable switch, a disable switch and a latch having first and second terminals, said enable switch being connected to said first voltage rail and said first terminal of said latch, said disable switch being connected to said first voltage rail and said second terminal of said latch, said first terminal of said latch also being connected to said clamping transistor, said enable switch and said disable switch of said control circuit being configured to selectively connect one of said first and second terminals of said latch to said first voltage rail in response to said RC-based signal from said RC circuit to selectively activate said clamping transistor to discharge said electrostatic discharge on said first voltage rail to said second voltage rail.

2. The circuit of claim 1 wherein said RC circuit includes a resistive element and a capacitive element connected in series between said first voltage rail and said second voltage rail.

3. The circuit of claim 1 wherein said latch includes first and second inverters that are connected such that an input of said first inverter is connected to an output of said second inverter and an output of said first inverter is connected to an input of said second inverter.

4. The circuit of claim 1 wherein said enable switch of said control circuit includes a first transistor on a first signal path between said first voltage rail and said first terminal of said latch, and wherein said disable switch of said control circuit includes a second transistor on a second signal path between said first voltage rail and said second terminal of said latch, said first and second transistors being connected to be responsive to said RC-based signal from said RC circuit.

5. The circuit of claim 4 wherein said enable switch of said control circuit includes a third transistor on said first signal path between said first voltage rail and said first transistor, and wherein said disable switch of said control circuit includes a fourth transistor on said second signal path between said first voltage rail and said second transistor.

6. The circuit of claim 4 wherein said control circuit includes an inverter having an input and an output, said input of said inverter being connected to said RC circuit and a control terminal of said first transistor, said output of said inverter being connected to a control terminal of said second transistor.

7. The circuit of claim 1 further comprising at least one inverter connected between said RC circuit and said control circuit.

8. The circuit of claim 1 further comprising:
a second clamping transistor connected between said first voltage rail and a second voltage rail; and
a second control circuit connected between said RC circuit and a second clamping transistor, said second control circuit including another latch having first and second terminals, said first terminal of said another latch being connected to said second clamping transistor, said second control circuit being configured to selectively connect one of said first and second terminals of said another latch to said first voltage rail in response to said RC-based signal from said RC circuit to selectively activate said second clamping transistor.

9. An electrostatic discharge protection circuit comprising:
an RC delay unit connected to a first voltage rail to produce an RC-based signal in response to an electrostatic discharge on said first voltage rail, said RC delay unit including an output to transmit said RC-based signal; and
a plurality of clamping units, each of said clamping units being connected to said output of said RC delay unit to receive said RC-based signal, each of said clamping units comprising:
a clamping transistor connected between said first voltage rail and a second voltage rail; and
a control circuit connected to said clamping transistor, said control circuit including an enable switch, a disable switch and a latch having first and second terminals, said enable switch being connected to said first voltage rail and said first terminal of said latch, said disable switch being connected to said first voltage rail and said second terminal of said latch, said first terminal of said latch also being connected to said clamping transistor, said enable switch and said disable switch of said control circuit being configured to selectively connect one of said first and second terminals of said latch to said first voltage rail in response to said RC-based signal from said RC delay unit to selectively activate said clamping transistor to discharge said electrostatic discharge on said first voltage rail to said second voltage rail.

10. The circuit of claim 9 wherein said RC delay unit includes a resistive element and a capacitive element connected in series between said first voltage rail and said second voltage rail.

11. The circuit of claim 10 wherein said RC delay unit further includes at least one inverter connected between said resistive element and said output.

12. The circuit of claim 9 wherein said latch includes first and second inverters that are connected such that an input of said first inverter is connected to an output of said second inverter and an output of said first inverter is connected to an input of said second inverter.

13. The circuit of claim 9 wherein said enable switch of said control circuit includes a first transistor on a first signal path between said first voltage rail and said first terminal of said latch, and wherein said disable switch of said control circuit includes a second transistor on a second signal path between said first voltage rail and said second terminal of said latch, said first and second transistors being connected to be responsive to said RC-based signal from said RC delay unit.

14. The circuit of claim 13 wherein said enable switch of said control circuit includes a third transistor on said first signal path between said first voltage rail and said first transistor, and wherein said disable switch of said control circuit includes a fourth transistor on said second signal path between said first voltage rail and said second transistor.

15. The circuit of claim 13 wherein said control circuit includes an inverter having an input and an output, said input of said inverter being connected to said RC delay unit and a control terminal of said first transistor, said output of said inverter being connected to a control terminal of said second transistor.

16. A method for providing electrostatic discharge protection comprising:
  producing an RC-based signal in response to an electrostatic discharge on a first voltage rail;
  connecting a control terminal of a clamping transistor to said first voltage rail through a first signal path using said RC-based signal, including activating an enable switch on said first signal path between said control terminal of said clamping transistor and said first voltage rail, such that said clamping transistor is activated to provide a conduction path from said first voltage rail to a second voltage rail through said clamping transistor;
  connecting a first terminal of a latch to said first voltage rail through a second signal path using said RC-based signal, including activating a disable switch on said second signal path between said first terminal of said latch and said first voltage rail, to produce a first signal at said first terminal of said latch; and
  producing a second signal at a second terminal of said latch connected to said first signal path and said control terminal of said clamping transistor in response to said first signal at said first terminal of said latch such that said clamping transistor is deactivated to disconnect said conduction path from said first voltage rail to said second voltage rail.

17. The method of claim 16 wherein said connecting said control terminal of said clamping transistor includes activating a first transistor of said enable switch on said first signal path between said first voltage rail and said latch using said RC-based signal.

18. The method of claim 17 wherein said connecting said first terminal of said latch includes activating a second transistor of said disable switch on said second signal path between said first voltage rail and said latch using said RC-based signal.

19. The method of claim 16 wherein said latch includes first and second inverters that are connected such that an input of said first inverter is connected to an output of said second inverter and an output of said first inverter is connected to an input of said second inverter.

20. The method of claim 16 wherein said first signal at said first terminal of said latch and said second signal at said second terminal of said latch are opposite signals.

* * * * *